US008069261B2

(12) United States Patent
Wang et al.

(10) Patent No.: US 8,069,261 B2
(45) Date of Patent: Nov. 29, 2011

(54) METHOD FOR REALIZING MULTIMEDIA MESSAGE SIGNATURE SERVICE

(75) Inventors: Jingxiang Wang, Shenzhen (CN); Xiang Zhou, Shenzhen (CN); Liang Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 477 days.

(21) Appl. No.: 12/293,590

(22) PCT Filed: Oct. 13, 2006

(86) PCT No.: PCT/CN2006/002695
§ 371 (c)(1),
(2), (4) Date: Sep. 19, 2008

(87) PCT Pub. No.: WO2007/115448
PCT Pub. Date: Oct. 18, 2007

(65) Prior Publication Data
US 2010/0161672 A1    Jun. 24, 2010

(30) Foreign Application Priority Data

Mar. 31, 2006 (CN) .......................... 2006 1 0066853

(51) Int. Cl.
*G06F 15/16* (2006.01)
(52) U.S. Cl. ......... 709/231; 707/922; 719/313; 455/466
(58) Field of Classification Search .................. 707/922; 709/277, 231; 719/313; 455/466
See application file for complete search history.

(56) References Cited

U.S. PATENT DOCUMENTS

| 6,510,453 | B1 * | 1/2003 | Apfel et al. ................... 709/206 |
| 2001/0034644 | A1 * | 10/2001 | Anavi et al. ..................... 705/14 |
| 2003/0193967 | A1 * | 10/2003 | Fenton et al. ................. 370/490 |
| 2004/0260719 | A1 * | 12/2004 | Giraud-Sauveur et al. ... 707/102 |
| 2007/0046823 | A1 * | 3/2007 | Jiang ............................. 348/582 |
| 2007/0198925 | A1 * | 8/2007 | He et al. ........................ 715/530 |

FOREIGN PATENT DOCUMENTS

| CN | 1649423 A | 8/2005 |
| EP | 0075728 A | 4/1983 |
| EP | 1460868 A1 | 9/2004 |
| WO | 2004021663 A1 | 3/2004 |

OTHER PUBLICATIONS

Supplementary European Search Report; European Patent Application No. 06804921.2; Feb. 24, 2009.
International Search Report; PCT/CN2006/002695; Jan. 10, 2007.

* cited by examiner

*Primary Examiner* — Cheyne Ly
(74) *Attorney, Agent, or Firm* — Thomas, Kayden, Horstemeyer & Risley, LLP

(57) ABSTRACT

A method for realizing the multimedia message signature service includes the following steps: a user asking for opening the multimedia message signature service; the BOSS sending the related information of the user whose multimedia message signature service has been opened to MMSC; the MMSC configuring the corresponding service function for the user whose multimedia message signature service has been opened, and synchronizing the said service function into its user database; the user setting the content of his multimedia message signature. By using this method, a new service mode can be created, and meanwhile, it has the function that enables a user to edit personalized information, and this greatly promotes the development of multimedia messaging service.

9 Claims, 3 Drawing Sheets

METHOD FOR REALIZING MULTIMEDIA MESSAGE SIGNATURE SERVICE

CROSS REFERENCE RELATED APPLICATIONS

This application is a national phase of PCT/CN2006/002695 filed Oct. 13, 2006, which claims priority to China Application Serial No. 200610066853.0 filed Mar. 31, 2006, which is entirely incorporated herein by reference.

TECHNICAL FIELD

The present invention relates to the data service in the mobile communication technology, and in particular, to a method for realizing the addition of user's signature in the multimedia message.

BACKGROUND

The MMS (multimedia messaging service) is a messaging service for transmitting multimedia content between mobile phones, between a mobile phone and Email server, or other applications. Compared with the short messaging service in the form of text, which has been applied successfully now, the multimedia message can provide the users with message content of several media forms including video, audio, and so on, thus the operators can provide users with very rich and personalized service. For example, the static pictures and dynamic videos of the beautiful scene seen on the way of trip can be shot and decorated with background music and then sent to relatives and friends in distance at will, or electronic cards made by oneself can be sent to them.

The maximum size of the content of a text message is only 140 bytes, whereas the size of the content of a multimedia message is much larger, generally around 100K bytes nowadays. However, with more and more powerful transmission capability of the wireless network and the higher transmission speed, the size of the message is not a key problem any more. With the development of the multimedia messaging service, there will be more and more users using the multimedia value-added service, especially the multimedia messaging service. How to direct more users to use the multimedia messaging service is a key issue.

Nowadays, the personalization of the multimedia message is not very evident for mobile phone's users; the messages sent are always fixed pictures or videos in which various personality elements including signature service can not be added by the users, because the users have some difficulty in editing the multimedia messages, for example, editing ability is limited, no individual signature or limited individual signature can be input, or the input is complicated; meanwhile, it costs a lot of time.

Therefore, a method for realizing the multimedia message signature service is desired to add personalized content into the multimedia content in order to enrich the MMS.

SUMMARY OF THE INVENTION

The technical problem to be solved in the present invention is to offer a method for realizing the multimedia message signature service to overcome the deficiency of inconvenience of editing multimedia messages in the mobile phone by the users and to enable the users to add personalized content into the multimedia content to enrich the MMS.

The method for realizing the multimedia message signature service offered in this invention comprises the following steps:

(1) A user asks the Business Operation Support System (BOSS) for opening his multimedia message signature service;

(2) The BOSS sends the relative information of the user whose multimedia message signature service has been opened to the Multimedia Messaging Service Center (MMSC);

(3) The MMSC configures the corresponding service function of multimedia message signature for the user whose multimedia message signature service has been opened and synchronizes the user information into its user database;

(4) The user sets his multimedia signature content and saves the multimedia signature content in the MMSC;

(5) When the user needs to add signature content to the multimedia message, one of a plurality of signatures saved in MMSC is selected to be sent.

Furthermore, the way for opening the multimedia message signature service in step (1) comprises:

opening the multimedia message signature service in the BOSS system through the service handling personnel;

Or opening the multimedia message signature service in the BOSS system through the self-service system.

Furthermore, in step (4) the user sets his multimedia message signature content through the self-service system, and this signature content is selected from the internal signature database of the MMSC or edited by the user himself.

Furthermore, the way for the user to set his multimedia message signature at least comprises: signing at the head of the signature content, signing at the end of the signature content, or signing in the intermediate region of the signature content.

Furthermore, the setting rules for the user to set his multimedia signature content in step (4) comprise:

Default signature rule, in which the user only selects a multimedia message signature content of the user;

Or divided-period signature rule, in which the user sets the multimedia message signature content according to different period of time;

Or signature rule for different users, in which the user customizes the multimedia message signature content according to the difference of receivers;

Or a combination of the above signature rules.

Furthermore, the method further comprises:

The user cancels his multimedia message signature service in the BOSS system through the service handling person or the self-service system;

The BOSS sends the user who needs to cancel his multimedia message signature service and the corresponding service information to the MMSC;

The MMSC queries the user information, and if the service of the user has not been opened yet, or the related information of the user can not be searched, the MMSC returns a failure response to the BOSS to prompt the related failure;

If the service of the user has been already opened, the information of the user database in the MMSC is modified and the response of successfully cancelling the service is returned after the successful modification.

Furthermore, the user can modify the multimedia message signature content of the user saved in the MMSC through the self-service system.

Furthermore, the MMSC generates the ID of one multimedia message signature content and save this multimedia message signature content when the user sets his multimedia message signature content.

Furthermore, step (3) further comprises:

The MMSC queries the user's information, and if the service of the user has been opened, it returns a failure response to the BOSS to prompt the related failure;

If the service of the user has not been opened, the information of the user database in the MMSC is modified and a response of success is returned to the BOSS after the successful modification.

Furthermore, step (5) comprises:

The sender edits and sends the multimedia message to the MMSC;

After receiving the multimedia message, the MMSC notifies the receiver to receive this message;

The MMSC queries whether the multimedia message signature service of the user has been opened or not;

If the multimedia message signature service of user has not been opened, the MMSC directly packages the multimedia message and sends the message of obtaining the response to the receiver;

If the multimedia message signature service of the user has been opened, the MMSC obtains the saved multimedia message signature content after finding out the content;

The MMSC processes the obtained multimedia message signature content, forms a complete message of obtaining response according to the signature content and the multimedia message content and sends it to the receiver.

The realizing method of the present invention is able to create a new service, meanwhile, it has the function that can enable the user to edit his personalized information, which greatly promotes the development of the multimedia messaging service.

PREFERRED EMBODIMENTS OF THE INVENTION

The method for realizing the multimedia message signature service in accordance with the present invention will be described-below in further detail with reference to the accompanying figures and the preferred embodiments.

Figure 1:
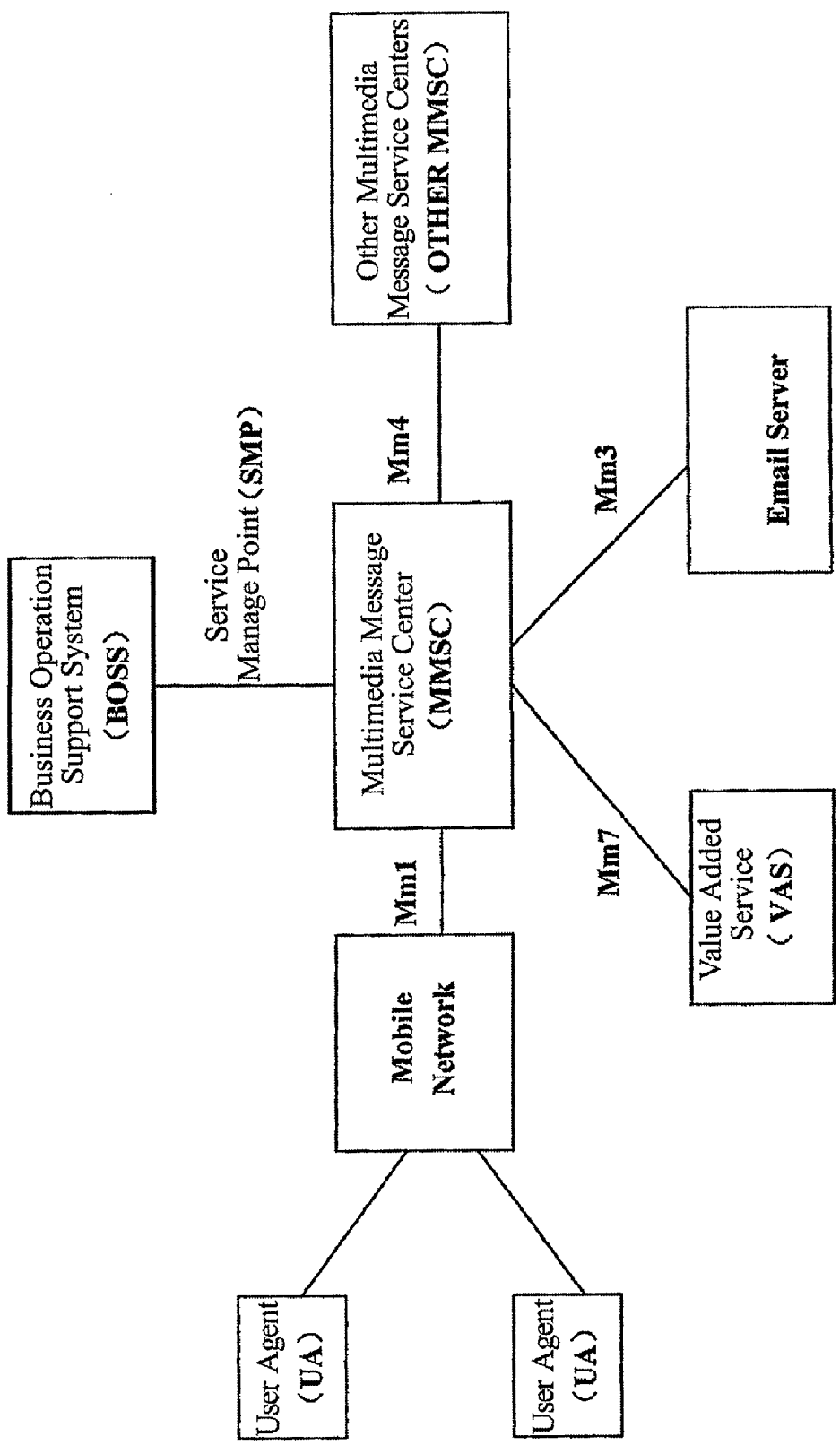
FIG. 1 is a structural diagram of a typical multimedia message signature system.

FIG. 1 is a structural diagram of a system for realizing the multimedia message signature service. The main entities and the corresponding functions included in FIG. 1 are as follows:

A Business Operation Support System (BOSS): is responsible for opening and cancelling the multimedia message signature service for the users; and sending the information of the user who asks for opening or cancelling his multimedia message signature service to the MMSC; wherein the interface between the BOSS and the MMSC is the Service Manage point (SMP) protocol.

A Multimedia messaging service Center (MMSC) is responsible for saving and forwarding the multimedia message as well as managing multimedia service for the user; wherein the interface between the MMSC and other MMSCs is Mm4 interface.

A User Agent (UA): i.e., the user mobile phone terminal, is for sending and receiving the multimedia message through the wireless network; wherein the interface between the mobile network and the MMSC is Mm1 interface.

A Value Added Services Application (VAS): it is an entity which mainly provides the multimedia applications and service; the VAS can send messages to the UA and receive message from the UA; wherein the interface between the VAS and the MMSC is Mm7 interface.

An Email Server: it can send the multimedia messages to the MMSC and receives multimedia message from the MMSC; wherein the interface between the Email Server and the MMSC is Mm3 interface.

In the following, the present invention will be illustrated by taking the process of sending the multimedia message signature between two mobile phone terminals belonging to the MMSC of the present invention as an example, and during the process, the sender does not require eternally saving or delayed sending the message and the receiver acquires the message immediately after it receives the notification message.

Figure 2:
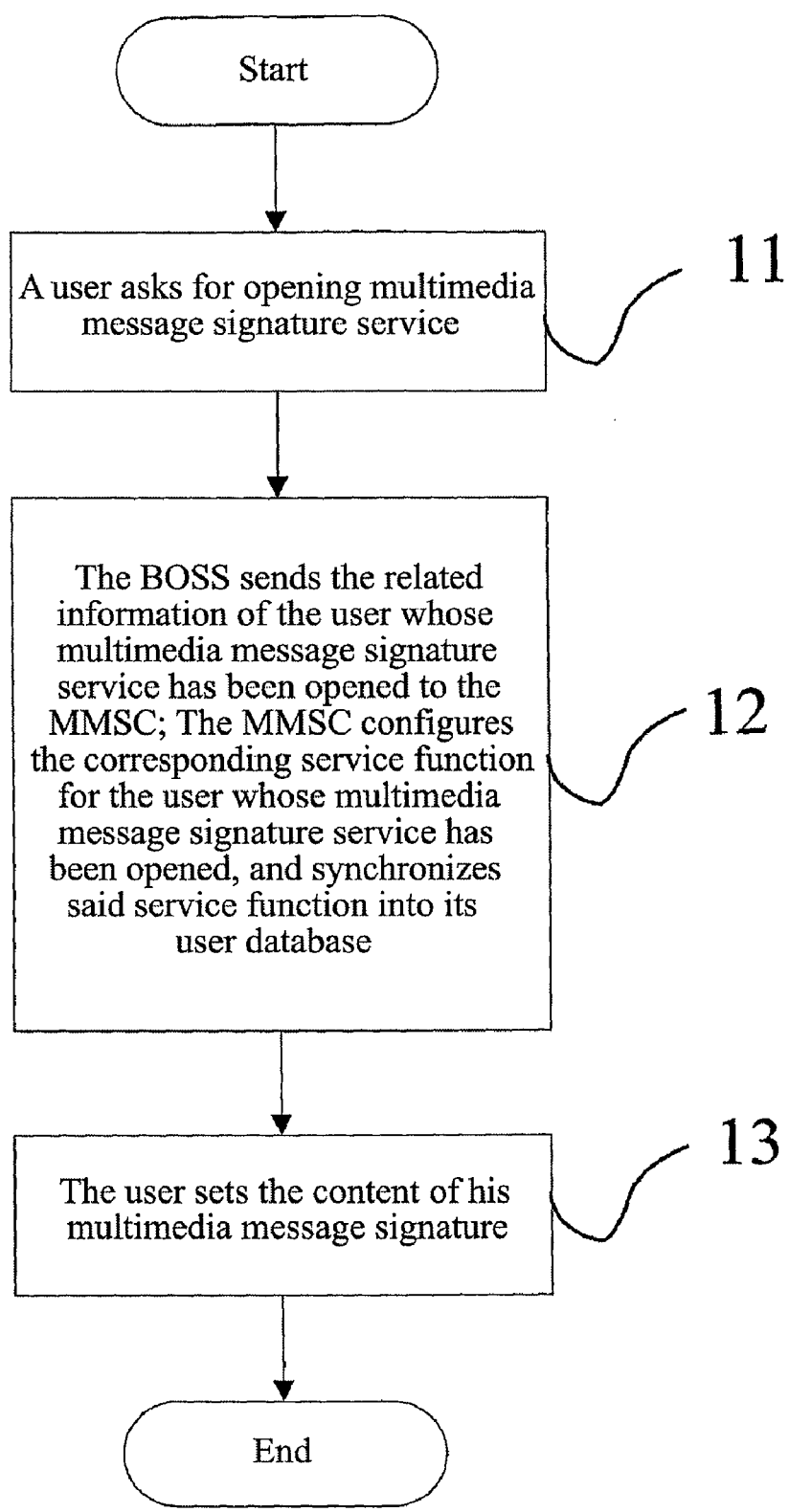
FIG. 2 is a main flow chart of the method for realizing the multimedia message signature service in accordance with the present invention.

FIG. 2 is a flow chart of the method for realizing the multimedia message signature service in accordance with the present invention. As shown in FIG. 2, in order to realize the above multimedia message signature service, the method mainly includes the following steps:

Step 11: the sender asks for opening multimedia message signature service, wherein the user whose service is opened through the handling personnel in the business hall or the self-service system, and the related information is saved in the BOSS;

Step 12: the BOSS notifies the related information of the user whose multimedia message signature service has been opened to the MMSC; and the MMSC configures the corresponding function for the user whose multimedia message signature service has been opened, and synchronizes the user information into its user database;

Step 13: the user whose multimedia message signature service has been opened sets the detailed content of his multimedia message signature.

In the method, as shown in the system in FIG. 1, the messages between the BOSS and the MMSC mainly include:

(a) the request message of the user asking for opening his multimedia message signature service The BOSS sends information of the user whose multimedia message signature service has been opened and the related service information to the MMSC. The MMSC queries the user information, returns a failure response to the BOSS and prompts the related failure if the user has opened the service; and updates the information of its user database, and a response message of success is returned after the successful modification if the user has not opened the service, (b) the request message of the user asking for canceling his multimedia message signature service If the user needs to cancel his multimedia message signature service, the service needs to be cancelled by the processing personnel in the business hall, and meanwhile, the information is updated in the user database of the BOSS. The BOSS sends information of the user who needs to cancel the multimedia message signature service and the related service information to the MMSC. The MMSC queries the information of the user, and if the user has not opened the service or the related information of the user can not be found out, the MMSC returns a failure response to the BOSS and prompts the related failure; if the user has opened the service, the MMSC updates the information of its user database and returns a response message of success after the successful modification.

In addition, if the user needs to edit the content of his multimedia message signature in step 13, the user can edit the content by the following ways:

1) adding a signature according to the existing content in the MMSC.

2) editing the content by the user himself

In addition, edition and modification should be performed in the self-service system. After the edition, the user self-service system saves the information to the MMSC and generates an ID for the multimedia message signature content, i.e., the saving position in the MMSC. The user can modify or cancel the content of the multimedia message signature at next time.

Figure 3:
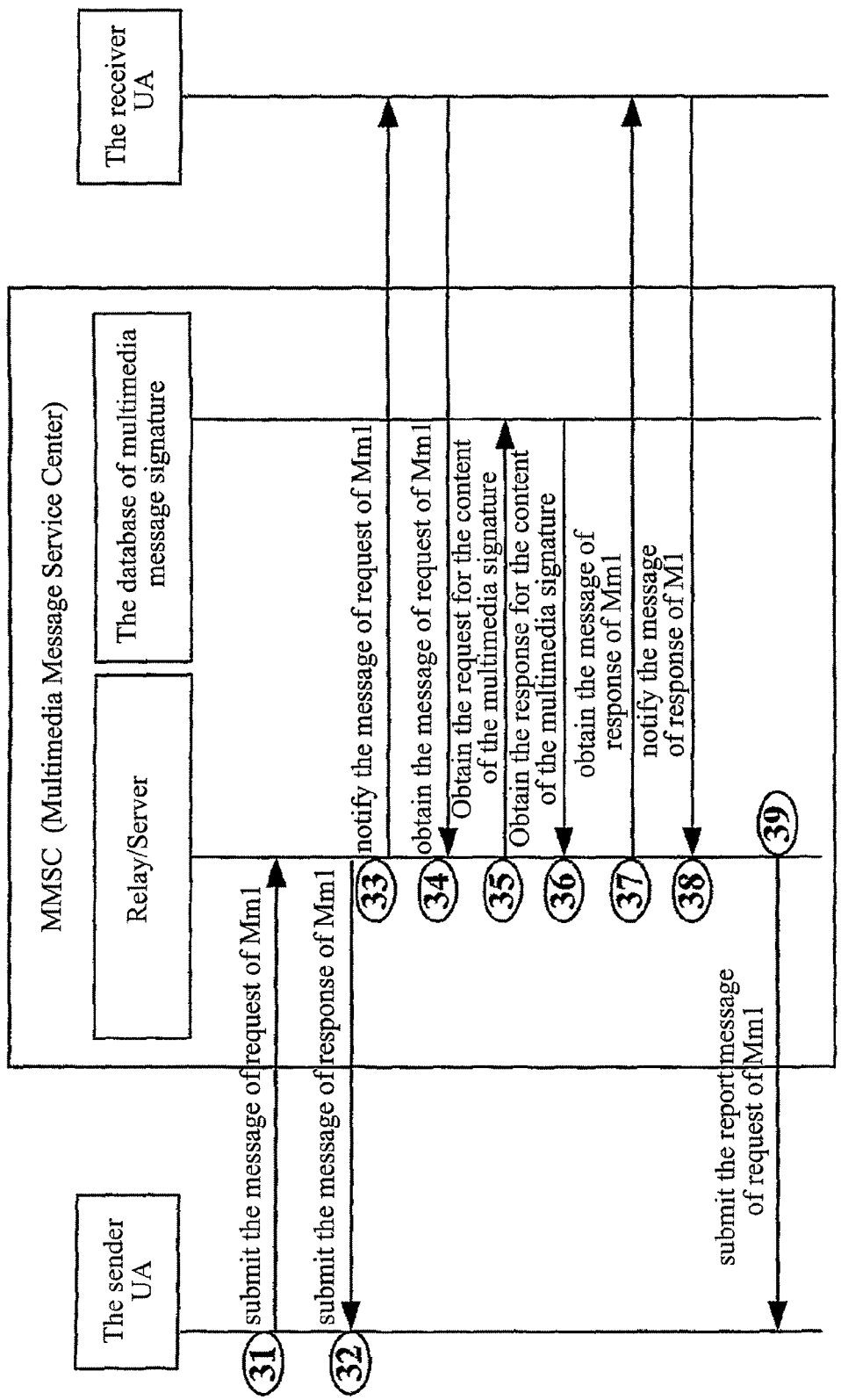
FIG. 3 is a service flow chart of the method in accordance with the present invention.

FIG. 3 is a flow chart of applying the realization method of the present invention. As shown in FIG. 3, the process of sending the message in the multimedia message signature service includes the following steps:

Step 31, a sender UA edits and submits a multimedia message of Mm1 interface to the MMSC;

Step 32: after the MMSC receives the multimedia message, it returns a Mm1 interface submitting response message;

Step 33: the MMSC sends a notification message request to a receiver UA;

Step 34: the receiver UA obtains the multimedia message;

Step 35: the MMSC queries related message control information and queries whether the sender UA has opened the multimedia message signature service; if the sender UA has not opened the multimedia message signature service, it directly packages the message and sends the message for obtaining response to the receiver UA; if the sender UA has opened the multimedia message signature service, it finds out the ID of the multimedia message signature content according to corresponding rules and sends the request for obtaining the multimedia message signature content to the multimedia signature database;

Step 36: the multimedia message signature database reads out the multimedia message signature content and sends it to the Relay/Server module of the MMSC;

Step 37: the MMSC forms a complete message for obtaining the response according to the signature content and the multimedia message content and sends it to the receiver UA;

Step 38: the receiver UA returns the response of the notification message to the MMSC after receiving the multimedia message;

Step 39: the MMSC sends the message of submitting report to the sender UA.

For the rules of the multimedia message signature content, simply, the MMSC mainly supports one multimedia message signature. However, it is not convenient; a better way is that it should support the following rules:

1. Default Signature Rule

The user basically makes no configuration, only selecting a multimedia message signature content configured by this user.

2. Divided-Period Signature Rule

The period can include a time period of one day, a specific memorial day, a specific month or a specific week, and so on;

The sender can write a plurality of signature messages with different IDs according to different time periods so as to select or edit and add the signature when the user needs to send the signature at different time periods.

3. Signature Rule of Different Users

The sender can customize the rule according to the difference of the receivers, such as the called number and the called number group, and edit the signatures of different IDs according to the characteristics of different users.

Different combinations can be generated according to divided periods and different users to form new service logic for the multimedia message signature.

By introducing a new service mode in the present invention, different personalized messages can be set for different users in the multimedia message signature. Moreover, the users can edit their own personalized messages, which can promote the development of multimedia message service.

The operation principle of the present invention is illustrated above in detail, but the preferred embodiment is just a visualized example to facilitate understanding and it is not intended to limit the scope of the present invention. Meanwhile, according to the description of the preferred embodiments and the technical scheme of the present invention, those skilled in the field can make all kinds of modification or variations which, however, will fall into the protection scope of the claims of the present invention.

INDUSTRIAL APPLICATION

The present invention provides a method for realizing the multimedia message signature service. By introducing a new service mode in the method, different personalized information can be set according to different users in the multimedia message signature. Moreover, for the users, they can edit their own personalized information, which can promote the development of the multimedia message service. Compared with the prior art, the method can add a new service mode and also has the function that can enable users to edit their own personalized information, which greatly facilitates the development of the multimedia messaging service.

The invention claimed is:

1. A method for realizing a multimedia message signature service, comprising the steps of:
   (1) a user asking a Business Operation Support System (BOSS) for opening the multimedia message signature service;
   (2) the BOSS sending relative information of the user whose multimedia message signature service has been opened to a Multimedia Messaging Service Center (MMSC);
   (3) the MMSC configuring a corresponding function of the multimedia message signature service for the user whose multimedia message signature service has been opened and synchronizing information of the user into a user database;
   (4) the user setting his multimedia signature content and saving the multimedia signature content in the MMSC; and
   (5) when needing to add signature content in a multimedia message, the user selecting one of a plurality of signatures saved in the MMSC to send;
   wherein step (3) further comprises:
   the MMSC querying the user's information, and returning a failure response to the BOSS to prompt a related failure if the multimedia message signature service of the user has been opened; and
   the MMSC modifying the information of the user database in the MMSC if the multimedia message signature service of the user has not been opened and returning a response of success to the BOSS after the successful modification.

2. The method of claim 1, wherein the way for opening the multimedia message signature service in step (1) comprises:
   opening the multimedia message signature service in the BOSS system through service handling personnel;

or opening the multimedia message signature service in the BOSS system through a self-service system.

3. The method of claim 1, wherein the user sets the multimedia signature content through the self-service system in step (4), and the set signature content is selected from an internal signature database of the MMSC or edited by the user himself.

4. The method of claim 1, wherein the way for the user to set the multimedia message signature at least comprises: signing at a head of the signature content, or signing at an end of the signature content, or signing at an intermediate region of the signature content.

5. The method of claim 1, wherein setting rules for the user to set the multimedia signature content in step (4) comprise:
   default signature rule, in which the user only selects one multimedia message signature of the user;
   or divided-period signature rule, in which the user sets the multimedia message signature content according to different periods of time;
   or signature rule of different users, in which the user customizes the multimedia message signature content according to difference receivers;
   or a combination of the above signature rules.

6. The method of claim 1, wherein the method further comprises:
   the user canceling the multimedia message signature service in the BOSS system through service handling personnel or a self-service system;
   the BOSS sending the information of the user who needs to cancel the multimedia message signature service and the corresponding service information to the MMSC;
   the MMSC querying the user's information, returning a failure response to the BOSS to prompt a related failure if the multimedia message signature service of the user has not been opened yet or the related information of the user can not be searched;
   the MMSC modifying information of the user database in the MMSC if the multimedia message signature service of the user has been already opened and returning a response of successfully cancelling the service after the successful modification.

7. The method of claim 1, wherein the user can modify the multimedia message signature content of the user saved in the MMSC through the self-service system.

8. The method of claim 1, wherein the MMSC generates an ID of the multimedia message signature content and saves the multimedia message signature content when the user sets his multimedia message signature content.

9. The method of claim 1, wherein step (5) comprises:
   a sender editing and sending the multimedia message to the MMSC;
   the MMSC notifying a receiver to receive the multimedia message after receiving the multimedia message;
   the MMSC querying whether the multimedia message signature service of the sender has been opened;
   the MMSC directly packaging the multimedia message and sending a message of obtaining the response to the receiver if the multimedia message signature service of the sender has not been opened;
   the MMSC obtaining the saved multimedia message signature content after finding out the multimedia message signature content if the multimedia message signature service of the sender has been opened;
   the MMSC processing the obtained multimedia message signature content, forming a complete message of obtaining the response according to the signature content and the multimedia message content, and sending the complete message to the receiver.

* * * * *